United States Patent
Lasser

(10) Patent No.: US 9,208,023 B2
(45) Date of Patent: Dec. 8, 2015

(54) SYSTEMS AND METHODS FOR SCHEDULING POST-WRITE READ IN NONVOLATILE MEMORY

(71) Applicant: SanDisk Technologies Inc., Plano, TX (US)

(72) Inventor: Menahem Lasser, Kohav Yair (IL)

(73) Assignee: SanDisk Technologies Inc., Plano, TX (US)

(*) Notice: Subject to any disclaimer, the term of this patent is extended or adjusted under 35 U.S.C. 154(b) by 168 days.

(21) Appl. No.: 14/139,110

(22) Filed: Dec. 23, 2013

(65) Prior Publication Data

US 2015/0178189 A1    Jun. 25, 2015

(51) Int. Cl.
*G06F 11/00* (2006.01)
*G06F 11/10* (2006.01)
*G06F 12/02* (2006.01)

(52) U.S. Cl.
CPC ............ *G06F 11/1072* (2013.01); *G06F 11/10* (2013.01); *G06F 11/1008* (2013.01); *G06F 12/0246* (2013.01)

(58) Field of Classification Search
CPC . G06F 11/10; G06F 11/1008; G06F 11/1072; G06F 12/0246
See application file for complete search history.

(56) References Cited

U.S. PATENT DOCUMENTS

| | | | |
|---|---|---|---|
| 5,070,032 A | 12/1991 | Yuan et al. | |
| 5,095,344 A | 3/1992 | Harari | |
| 5,313,421 A | 5/1994 | Guterman et al. | |
| 5,315,541 A | 5/1994 | Harari et al. | |
| 5,343,063 A | 8/1994 | Yuan et al. | |
| 5,570,315 A | 10/1996 | Tanaka et al. | |
| 5,595,924 A | 1/1997 | Yuan et al. | |
| 5,661,053 A | 8/1997 | Yuan | |
| 5,768,192 A | 6/1998 | Eitan | |
| 5,903,495 A | 5/1999 | Takeuchi et al. | |
| 6,011,725 A | 1/2000 | Eitan | |
| 6,046,935 A | 4/2000 | Takeuchi et al. | |
| 6,222,762 B1 | 4/2001 | Guterman et al. | |
| 2002/0126528 A1* | 9/2002 | Conley et al. | 365/185.04 |
| 2004/0001356 A1* | 1/2004 | Kawamura et al. | 365/185.11 |
| 2007/0101189 A1* | 5/2007 | Shinbori et al. | 714/8 |
| 2007/0168754 A1* | 7/2007 | Zohar et al. | 714/42 |
| 2012/0220088 A1 | 8/2012 | Alsmeier | |
| 2013/0028021 A1 | 1/2013 | Sharon et al. | |
| 2013/0031429 A1 | 1/2013 | Sharon et al. | |
| 2013/0031430 A1 | 1/2013 | Sharon | |
| 2013/0031431 A1 | 1/2013 | Sharon et al. | |
| 2013/0107628 A1 | 5/2013 | Dong et al. | |
| 2014/0177320 A1* | 6/2014 | Kim | 365/148 |
| 2014/0219034 A1* | 8/2014 | Gomez et al. | 365/185.22 |

OTHER PUBLICATIONS

Eitan et al., "NROM: A Novel Localized Trapping, 2-Bit Nonvolatile Memory Cell," IEEE Electron Device Letters, vol. 21, No. 11, Nov. 2000, pp. 543-545.

* cited by examiner

*Primary Examiner* — Joshua P Lottich

(74) *Attorney, Agent, or Firm* — Davis Wright Tremaine LLP

(57) ABSTRACT

Post-write reading of data stored in a memory is performed only after a threshold amount of time has elapsed from the time the data was programmed. The threshold amount of time is at least the relaxation time of the memory cells, so that memory cells have reached stable states when post-write reading is performed.

22 Claims, 13 Drawing Sheets

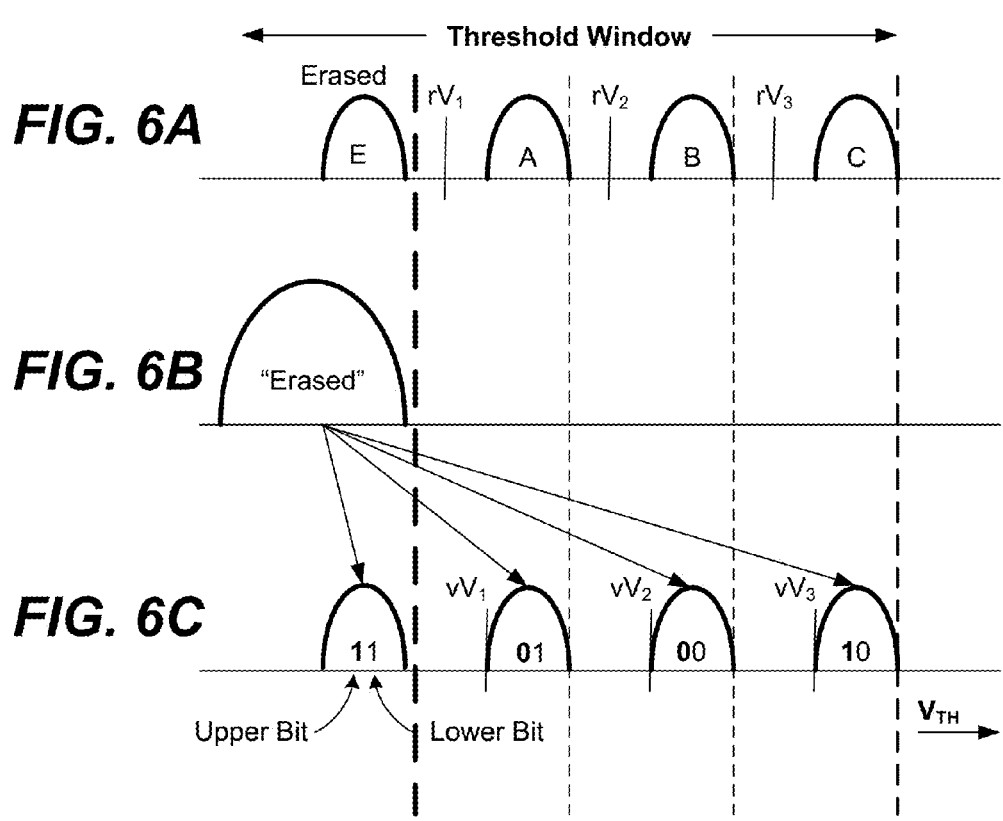
Programming into four states represented by a 2-bit code

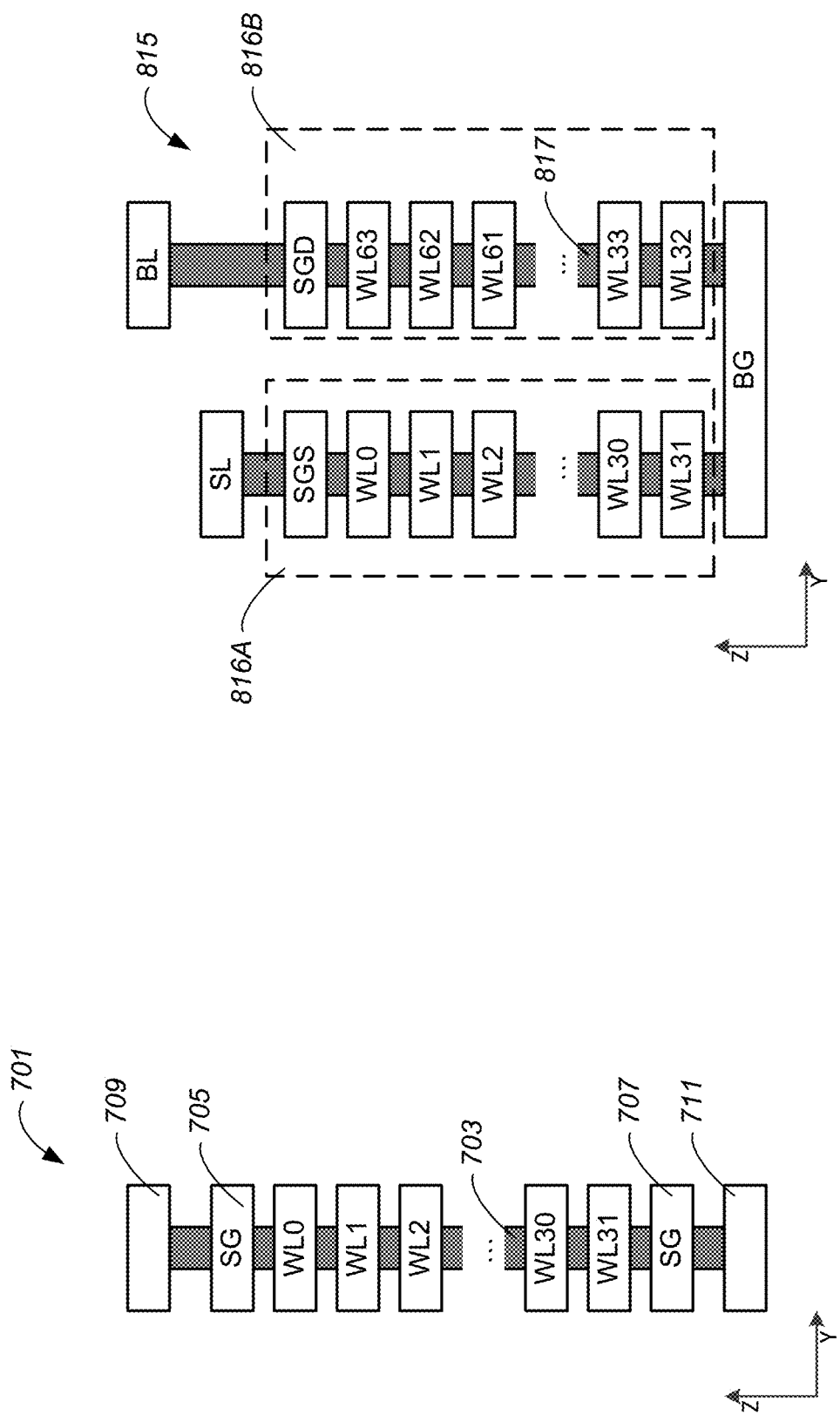

SYSTEMS AND METHODS FOR SCHEDULING POST-WRITE READ IN NONVOLATILE MEMORY

BACKGROUND

This application relates to the operation of nonvolatile memory systems such as semiconductor flash memory.

Solid-state memory capable of nonvolatile storage of charge, particularly in the form of flash EEPROM packaged as a small form factor card, has become the storage of choice in a variety of mobile and handheld devices, notably information appliances and consumer electronics products. Unlike RAM (random access memory) that is also solid-state memory, flash memory is non-volatile, and retains its stored data even after power is turned off. Also, unlike ROM (read only memory), flash memory is rewritable similar to a disk storage device. In spite of the higher cost, flash memory is increasingly being used in mass storage applications.

Flash EEPROM is similar to EEPROM (electrically erasable and programmable read-only memory) in that it is a non-volatile memory that can be erased and have new data written or "programmed" into their memory cells. Both utilize a floating (unconnected) conductive gate, in a field effect transistor structure, positioned over a channel region in a semiconductor substrate, between source and drain regions. A control gate is then provided over the floating gate. The threshold voltage characteristic of the transistor is controlled by the amount of charge that is retained on the floating gate. That is, for a given level of charge on the floating gate, there is a corresponding voltage (threshold) that must be applied to the control gate before the transistor is turned "on" to permit conduction between its source and drain regions. Flash memory such as Flash EEPROM allows entire blocks of memory cells to be erased at the same time.

The floating gate can hold a range of charges and therefore can be programmed to any threshold voltage level within a threshold voltage window. The size of the threshold voltage window is delimited by the minimum and maximum threshold levels of the device, which in turn correspond to the range of the charges that can be programmed onto the floating gate. The threshold window generally depends on the memory device's characteristics, operating conditions and history. Each distinct, resolvable threshold voltage level range within the window may, in principle, be used to designate a definite memory state of the cell.

Nonvolatile memory devices are also manufactured from memory cells with a dielectric layer for storing charge. Instead of the conductive floating gate elements described earlier, a dielectric layer is used. Such memory devices utilizing dielectric storage element have been described by Eitan et al., "NROM: A Novel Localized Trapping, 2-Bit Nonvolatile Memory Cell," IEEE Electron Device Letters, vol. 21, no. 11, November 2000, pp. 543-545. An ONO dielectric layer extends across the channel between source and drain diffusions. The charge for one data bit is localized in the dielectric layer adjacent to the drain, and the charge for the other data bit is localized in the dielectric layer adjacent to the source. For example, U.S. Pat. Nos. 5,768,192 and 6,011,725 disclose a nonvolatile memory cell having a trapping dielectric sandwiched between two silicon dioxide layers. Multi-state data storage is implemented by separately reading the binary states of the spatially separated charge storage regions within the dielectric.

SUMMARY OF THE INVENTION

Some memory cells tend not to achieve a stable programmed state until sometime after completion of programming. The time for cells to reach their stable programmed condition may be referred to as "relaxation time." Reading memory cells before they have reached a stable state may be misleading. For example, where data is read in a post-write read for verification purposes before the data is stable, the data may appear to be acceptable even though the data later becomes unacceptable due to relaxation. Post-write read results obtained after cells have reached stable conditions (after relaxation time has elapsed from programming) are a more accurate indication of whether it is safe to depend on the stored data (and erase any other copies of the data, or redundancy data associated with it). Timing may ensure that post-write reading of data is only performed when memory cells are stable by allowing post-write reads only after a threshold period of time equal to, or longer than the relaxation time has elapsed since programming. Timing may be done on a block-by-block basis, or on a page-by-page basis.

An example of a method of operating a memory array includes: performing a write operation that writes data to a destination block; subsequently maintaining a time tag that indicates a time equal to or later than a time of completion of the write operation; comparing elapsed time from the time tag with a predetermined minimum elapsed time; and performing a post-write read operation to verify that data in the destination block is acceptable only after the elapsed time meets or exceeds the predetermined minimum elapsed time.

The write operation may be part of a copy operation. The copy operation may copy data from a source block to the destination block and the data in the destination block may be verified as acceptable by comparison with corresponding data in the source block. The source block may be a Single Level Cell (SLC) block and the destination block may be a Multi Level Cell (MLC) block. The data in the destination block may be verified as acceptable by applying Error Correction Code (ECC) decoding to determine a number of errors in the data. The data in the destination block may be verified as acceptable by estimating a number of bad bits in the data in the destination block from numbers of satisfied and/or unsatisfied parity equations. The write operation may be part of a sequence of write operations to the destination block and the time tag may indicate a time equal to or later than a time of completion of the sequence of write operations. The write operation may be directed to a page of the destination block, additional data may be written to additional pages of the destination block and an additional time tag may be maintained for each additional page written to the destination block. The predetermined minimum elapsed time may exceed a relaxation time of the memory. The post-write read operation of the page may be performed before completion of the writing to at least one of the additional pages of the destination block. The post-write read operation of the page may be performed only after all writing to the additional pages of the destination block is complete.

An example of a nonvolatile memory system includes: a nonvolatile memory array that includes a plurality of blocks; a write circuit that writes data to a destination block; a timer unit that maintains a time tag that indicates a time equal to or later than a time of writing of the data to the destination block; and a post-write verification unit that initiates a post-write verification operation to determine whether data written to the destination block is acceptable only after the timer unit indicates the elapsed time from the time tag exceeds a predetermined period.

A read circuit may read the data from a source block and send the data to the write circuit. The post-write verification unit may include a comparison unit for comparing a copy of the data read from the destination block with a copy of the data read from the source block. The source block may be a Single Level Cell (SLC) block and the destination block is a Multi Level Cell (MLC) block. An Error Correction Code (ECC) circuit may determine a number of bad bits in a copy of the data read from the destination block in the post-write verification operation. An error estimation circuit may estimate a number of bad bits from numbers of satisfied and/or unsatisfied parity equations. The timer unit may maintain a single time tag for a sequence of write operations to the destination block, the time tag indicating a time equal to or later than a time of completion of the sequence of write operations. The timer unit may maintain time tags for individual pages written in a sequence of write operations to the destination block, an individual time tag indicating a time equal to or later than a time of writing data to a corresponding page in a corresponding write operation of the sequence of write operations. The nonvolatile memory array may have a relaxation time and the predetermined period may exceed the relaxation time. The post-write verification unit may initiate the post-write verification operation to determine whether data written to a first page in a first write operation of the sequence of write operations is acceptable prior to the write circuit writing additional data to a second page in second write operation of the sequence of write operations. The post-write verification unit may initiate the post-write verification operation to determine whether data written in the sequence of write operations to the destination block is acceptable only after all writing in the sequence of write operations to the destination block is complete.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BRIEF DESCRIPTION OF THE DRAWINGS

FIGS. 6A-6C illustrate an example of programming a population of memory cells.

FIG. 7 shows an example of a physical structure of a 3-D NAND string.

FIG. 8 shows an example of a physical structure of a U-shaped 3-D NAND string.

DETAILED DESCRIPTION

Memory System

Figure 1:
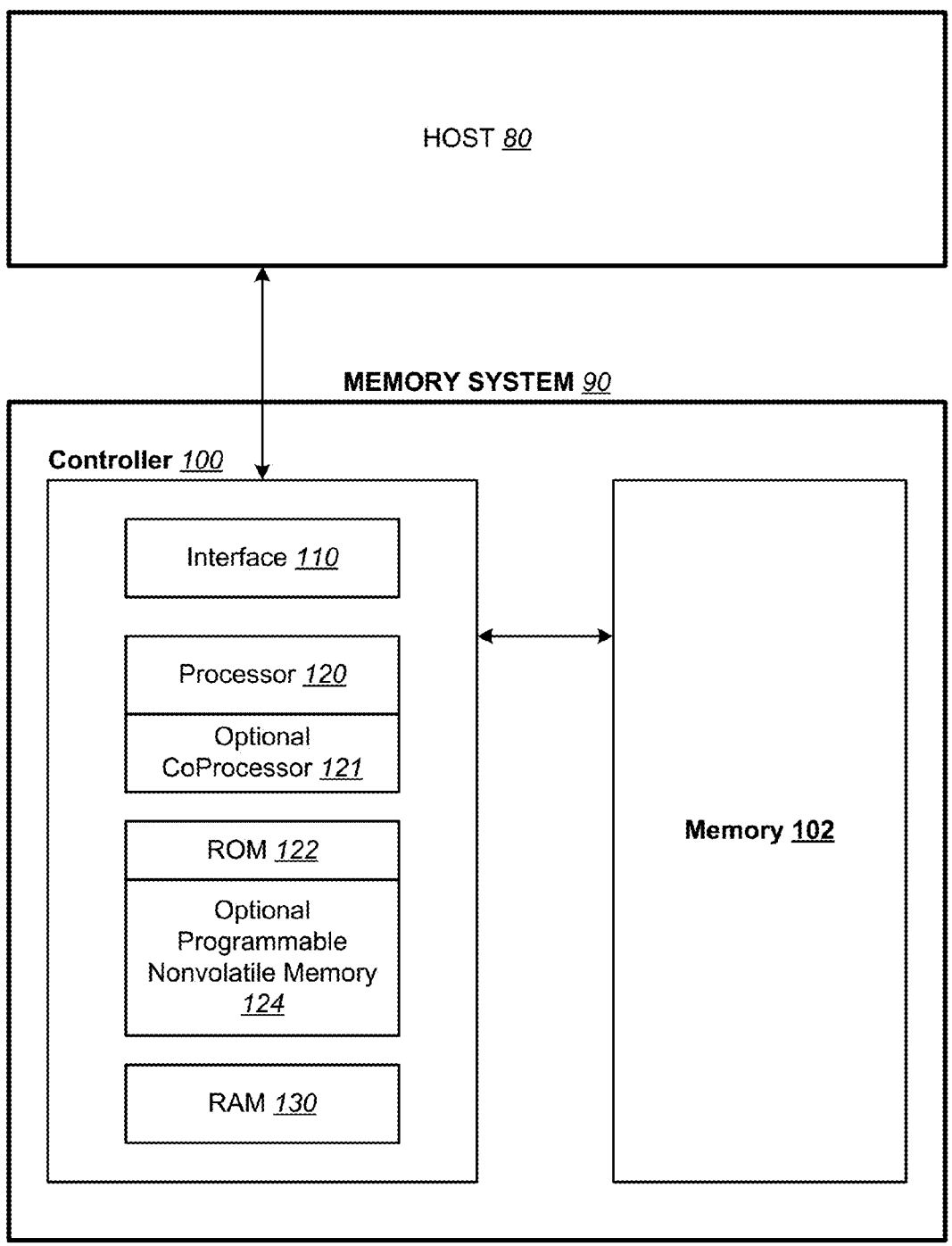
FIG. 1 illustrates schematically the main hardware components of a memory system suitable for implementing the present invention.

FIG. 1 illustrates schematically the main hardware components of a memory system suitable for implementing the present invention. The memory system 90 typically operates with a host 80 through a host interface. The memory system may be in the form of a removable memory such as a memory card, or may be in the form of an embedded memory system. The memory system 90 includes a memory 102 whose operations are controlled by a controller 100. The memory 102 comprises one or more array of non-volatile memory cells distributed over one or more integrated circuit chip. The controller 100 may include interface circuits 110, a processor 120, ROM (read-only-memory) 122, RAM (random access memory) 130, programmable nonvolatile memory 124, and additional components. The controller is typically formed as an ASIC (application specific integrated circuit) and the components included in such an ASIC generally depend on the particular application.

Physical Memory Structure

Figure 2:
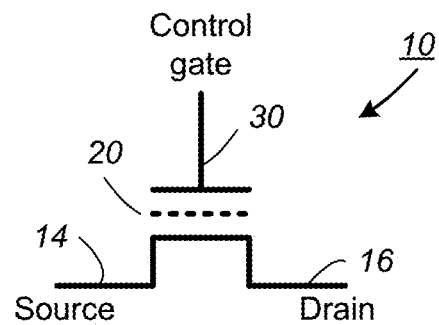
FIG. 2 illustrates schematically a non-volatile memory cell.

FIG. 2 illustrates schematically a non-volatile memory cell. The memory cell 10 can be implemented by a field-effect transistor having a charge storage unit 20, such as a floating gate or a charge trapping (dielectric) layer. The memory cell 10 also includes a source 14, a drain 16, and a control gate 30.

There are many commercially successful non-volatile solid-state memory devices being used today. These memory devices may employ different types of memory cells, each type having one or more charge storage element.

Typical non-volatile memory cells include EEPROM and flash EEPROM. Examples of EEPROM cells and methods of manufacturing them are given in U.S. Pat. No. 5,595,924. Examples of flash EEPROM cells, their uses in memory systems and methods of manufacturing them are given in U.S. Pat. Nos. 5,070,032, 5,095,344, 5,315,541, 5,343,063, 5,661, 053, 5,313,421 and 6,222,762. In particular, examples of memory devices with NAND cell structures are described in U.S. Pat. Nos. 5,570,315, 5,903,495, 6,046,935. Also, examples of memory devices utilizing dielectric storage elements have been described by Eitan et al., "NROM: A Novel Localized Trapping, 2-Bit Nonvolatile Memory Cell," IEEE Electron Device Letters, vol. 21, no. 11, November 2000, pp. 543-545, and in U.S. Pat Nos. 5,768,192 and 6,011,725.

In practice, the memory state of a cell is usually read by sensing the conduction current across the source and drain electrodes of the cell when a reference voltage is applied to the control gate. Thus, for each given charge on the floating gate of a cell, a corresponding conduction current with respect to a fixed reference control gate voltage may be detected. Similarly, the range of charge programmable onto the floating gate defines a corresponding threshold voltage window or a corresponding conduction current window.

Alternatively, instead of detecting the conduction current among a partitioned current window, it is possible to set the threshold voltage for a given memory state under test at the control gate and detect if the conduction current is lower or higher than a threshold current (cell-read reference current). In one implementation the detection of the conduction current relative to a threshold current is accomplished by examining the rate the conduction current is discharging through the capacitance of the bit line.

Figure 3:
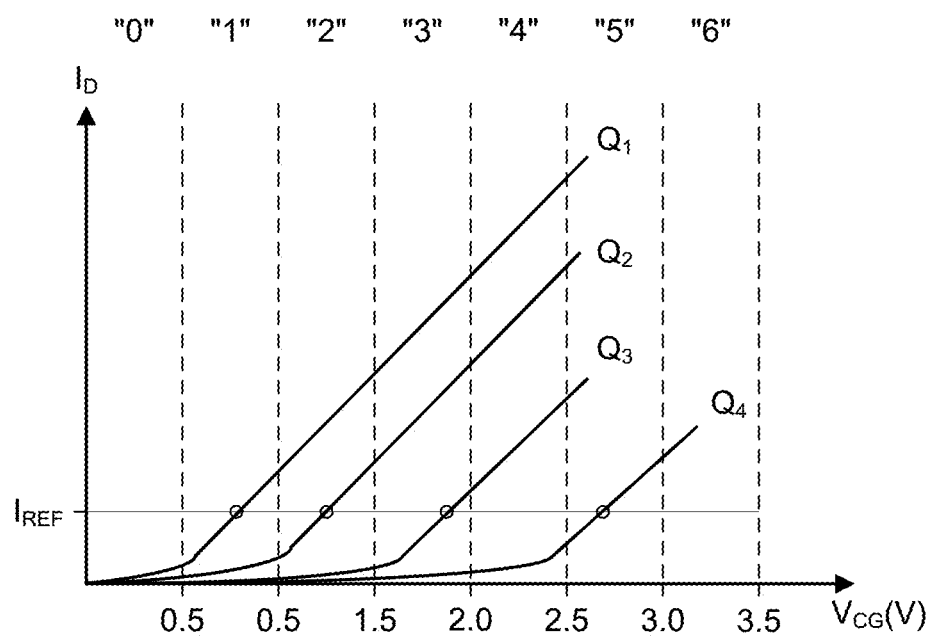
FIG. 3 illustrates the relation between the source-drain current $I_D$ and the control gate voltage $V_{CG}$ for four different charges Q1-Q4 that the floating gate may be selectively storing at any one time at fixed drain voltage.

FIG. 3 illustrates the relation between the source-drain current $I_D$ and the control gate voltage $V_{CG}$ for four different charges Q1-Q4 that the floating gate may be selectively storing at any one time. With fixed drain voltage bias, the four solid $I_D$ versus $V_{CG}$ curves represent four of seven possible charge levels that can be programmed on a floating gate of a memory cell, respectively corresponding to four possible memory states. As an example, the threshold voltage window of a population of cells may range from 0V to 3.5V. Seven possible programmed memory states "0", "1", "2", "3", "4", "5", "6", and an erased state (not shown) may be demarcated by partitioning the threshold window into regions in intervals of 0.5V each. For example, if a reference current, IREF of 2 μA is used as shown, then the cell programmed with Q1 may be considered to be in a memory state "1" since its curve intersects with $I_{REF}$ in the region of the threshold window demarcated by VCG=0.5V and 1.0V. Similarly, Q4 is in a memory state "5".

As can be seen from the description above, the more states a memory cell is made to store, the more finely divided is its threshold voltage window. For example, a memory device may have memory cells having a threshold voltage window that ranges from −1.5V to 5V. This provides a maximum width of 6.5V. If the memory cell is to store 16 states, each state may occupy from 200 mV to 300 mV in the threshold window. This will require higher precision in programming and reading operations in order to be able to achieve the required resolution.

NAND Structure

Figure 4A:
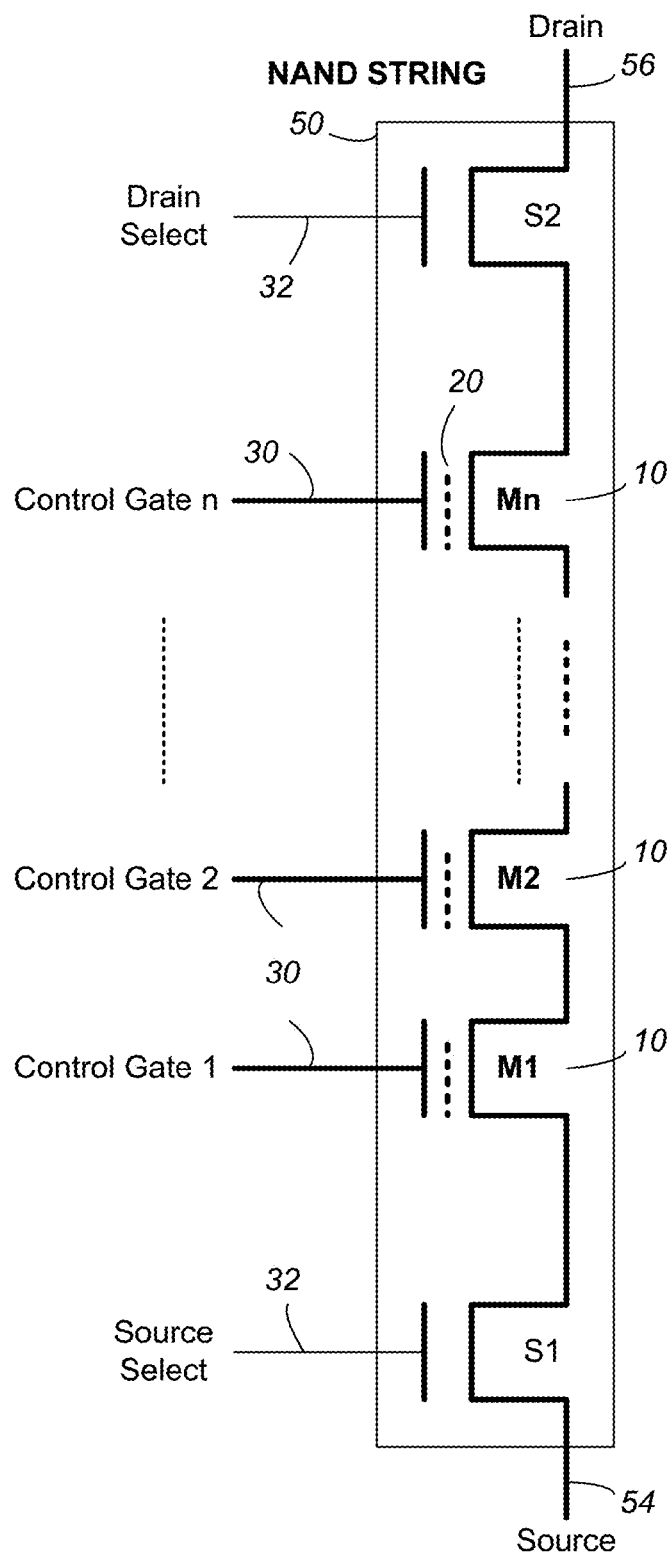
FIG. 4A illustrates schematically a string of memory cells organized into a NAND string.

FIG. 4A illustrates schematically a string of memory cells organized into a NAND string. A NAND string 50 comprises a series of memory transistors M1, M2, . . . Mn (e.g., n=4, 8, 16 or higher) daisy-chained by their sources and drains. A pair of select transistors S1, S2 controls the memory transistor chain's connection to the external world via the NAND string's source terminal 54 and drain terminal 56 respectively. In a memory array, when the source select transistor S1 is turned on, the source terminal is coupled to a source line (see FIG. 4B). Similarly, when the drain select transistor S2 is turned on, the drain terminal of the NAND string is coupled to a bit line of the memory array. Each memory transistor 10 in the chain acts as a memory cell. It has a charge storage element 20 to store a given amount of charge so as to represent an intended memory state. A control gate 30 of each memory transistor allows control over read and write operations. As will be seen in FIG. 4B, the control gates 30 of corresponding memory transistors of a row of NAND string are all connected to the same word line. Similarly, a control gate 32 of each of the select transistors S1, S2 provides control access to the NAND string via its source terminal 54 and drain terminal 56 respectively. Likewise, the control gates 32 of corresponding select transistors of a row of NAND string are all connected to the same select line.

When an addressed memory transistor 10 within a NAND string is read or is verified during programming, its control gate 30 is supplied with an appropriate voltage. At the same time, the rest of the non-addressed memory transistors in the NAND string 50 are fully turned on by application of sufficient voltage on their control gates. In this way, a conductive path is effectively created from the source of the individual memory transistor to the source terminal 54 of the NAND string and likewise for the drain of the individual memory transistor to the drain terminal 56 of the NAND string. Memory devices with such NAND string structures are described in U.S. Pat. Nos. 5,570,315, 5,903,495, 6,046,935.

Figure 4B:
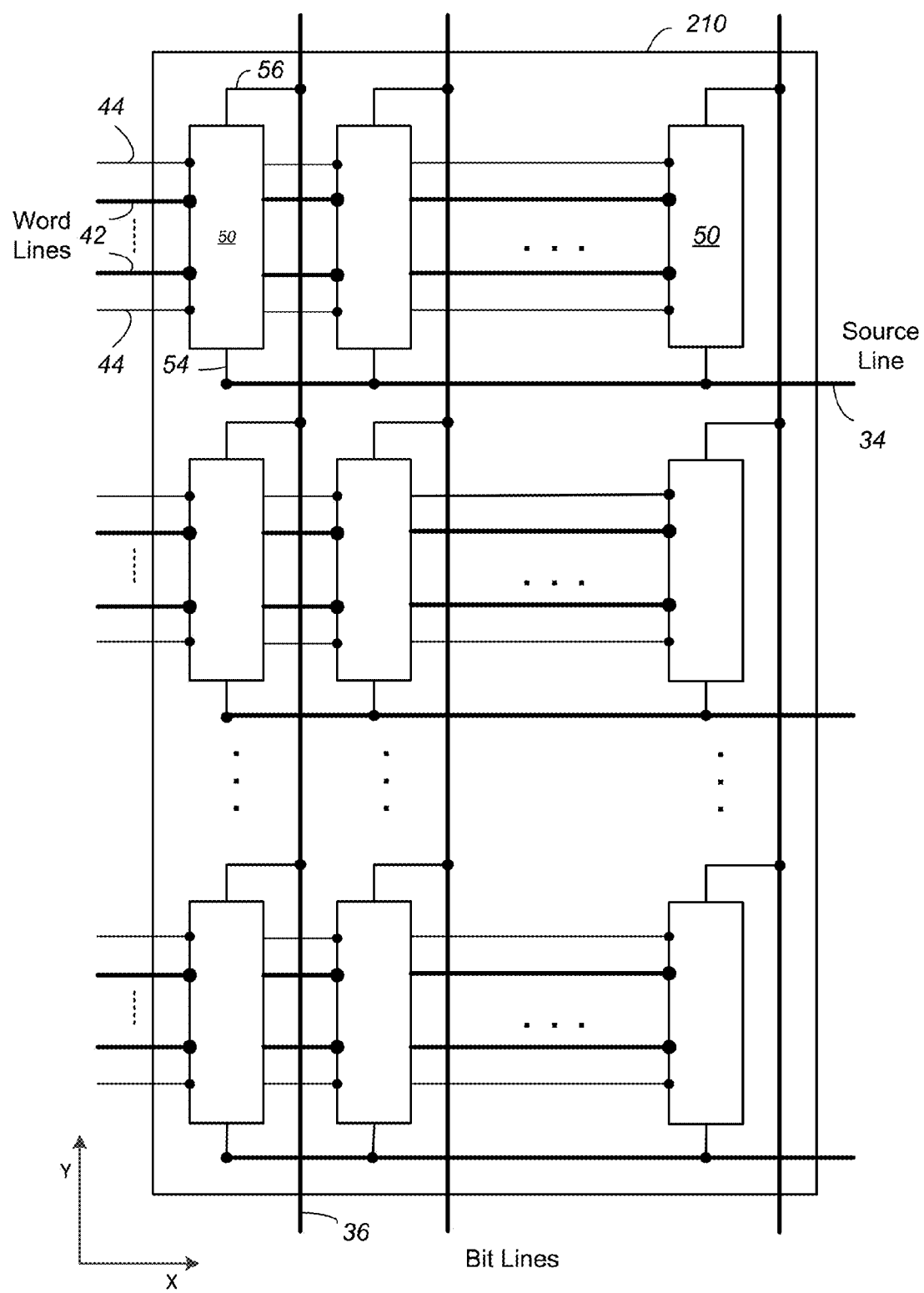
FIG. 4B illustrates an example of a NAND array 210 of memory cells, constituted from NAND strings 50 such as that shown in FIG. 4A.

FIG. 4B illustrates an example of a NAND array 210 of memory cells, constituted from NAND strings 50 such as that shown in FIG. 4A. Along each column of NAND strings, a bit line such as bit line 36 is coupled to the drain terminal 56 of each NAND string. Along each bank of NAND strings, a source line such as source line 34 is coupled to the source terminals 54 of each NAND string. Also the control gates along a row of memory cells in a bank of NAND strings are connected to a word line such as word line 42. The control gates along a row of select transistors in a bank of NAND strings are connected to a select line such as select line 44. An entire row of memory cells in a bank of NAND strings can be addressed by appropriate voltages on the word lines and select lines of the bank of NAND strings.

Figure 5:
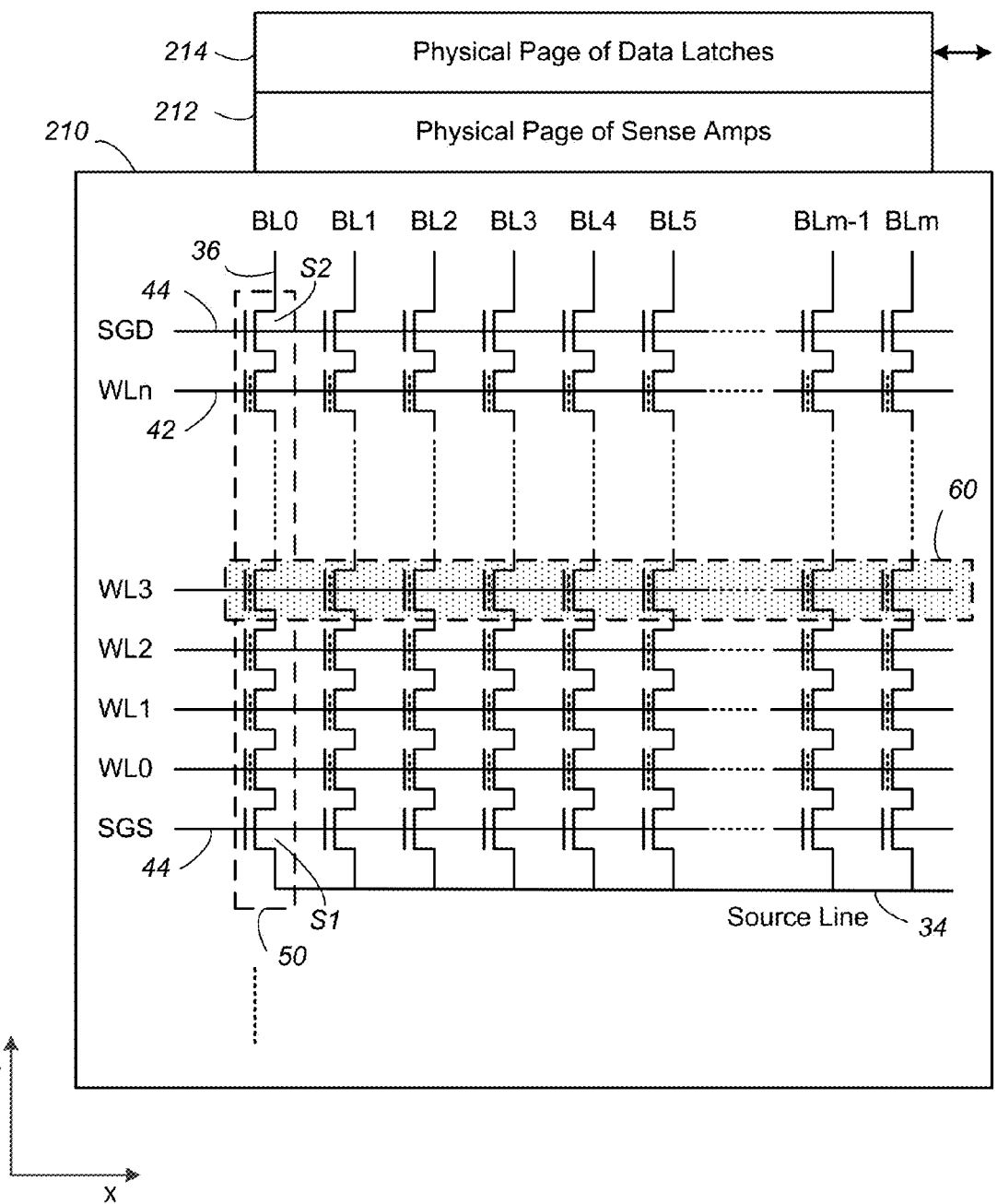
FIG. 5 illustrates a page of memory cells, organized in the NAND configuration, being sensed or programmed in parallel.

FIG. 5 illustrates a page of memory cells, organized in the NAND configuration, being sensed or programmed in parallel. FIG. 5 essentially shows a bank of NAND strings 50 in the memory array 210 of FIG. 4B, where the detail of each NAND string is shown explicitly as in FIG. 4A. A physical page, such as the page 60, is a group of memory cells enabled to be sensed or programmed in parallel. This is accomplished by a corresponding page of sense amplifiers 212. The sensed results are latched in a corresponding set of latches 214. Each sense amplifier can be coupled to a NAND string via a bit line. The page is enabled by the control gates of the cells of the page connected in common to a word line 42 and each cell accessible by a sense amplifier accessible via a bit line 36. As an example, when respectively sensing or programming the page of cells 60, a sensing voltage or a programming voltage is respectively applied to the common word line WL3 together with appropriate voltages on the bit lines.

Physical Organization of the Memory

One important difference between flash memory and other of types of memory is that a cell must be programmed from the erased state. That is the floating gate must first be emptied of charge. Programming then adds a desired amount of charge back to the floating gate. It does not support removing a portion of the charge from the floating gate to go from a more programmed state to a lesser one. This means that updated data cannot overwrite existing data and must be written to a previous unwritten location.

Furthermore erasing is to empty all the charges from the floating gate and generally takes appreciable time. For that reason, it will be cumbersome and very slow to erase cell by cell or even page by page. In practice, the array of memory cells is divided into a large number of blocks of memory cells. As is common for flash EEPROM systems, the block is the unit of erase. That is, each block contains the minimum number of memory cells that are erased together. While aggregating a large number of cells in a block to be erased in parallel will improve erase performance, a large size block also entails dealing with a larger number of update and obsolete data.

Each block is typically divided into a number of physical pages. A logical page is a unit of programming or reading that contains a number of bits equal to the number of cells in a physical page. In a memory that stores one bit per cell, one physical page stores one logical page of data. In memories that store two bits per cell, a physical page stores two logical pages. The number of logical pages stored in a physical page thus reflects the number of bits stored per cell. In one embodiment, the individual pages may be divided into segments and the segments may contain the fewest number of cells that are written at one time as a basic programming operation. One or more logical pages of data are typically stored in one row of memory cells. A page can store one or more sectors. A sector includes user data and overhead data.

MLC Programming

FIG. 6A-6C illustrate an example of programming a population of 4-state memory cells. FIG. 6A illustrates the population of memory cells programmable into four distinct distributions of threshold voltages respectively representing memory states "E", "A", "B" and "C". FIG. 6B illustrates the initial distribution of "erased" threshold voltages for an erased memory. FIG. 6C illustrates an example of the memory after many of the memory cells have been programmed. Essentially, a cell initially has an "erased" threshold voltage and programming will move it to a higher value into one of the three zones demarcated by verify levels $vV_1$, $vV_2$ and $vV_3$. In this way, each memory cell can be programmed to one of the three programmed states "A", "B" and "C" or remain un-programmed in the "erased" state. As the memory gets more programming, the initial distribution of the "erased" state as shown in FIG. 6B will become narrower and the erased state is represented by the "E" state.

A 2-bit code having a lower bit and an upper bit can be used to represent each of the four memory states. For example, the "E", "A", "B" and "C" states are respectively represented by "11", "01", "00" and "10". The 2-bit data may be read from the memory by sensing in "full-sequence" mode where the two bits are sensed together by sensing relative to the read demarcation threshold values $rV_1$, $rV_2$ and $rV_3$ in three subpasses respectively.

3-D NAND Structure

An alternative arrangement to a conventional two-dimensional (2-D) NAND array is a three-dimensional (3-D) array. In contrast to 2-D NAND arrays, which are formed along a planar surface of a semiconductor wafer, 3-D arrays extend up from the wafer surface and generally include stacks, or columns, of memory cells extending upwards. Various 3-D arrangements are possible. In one arrangement a NAND string is formed vertically with one end (e.g. source) at the wafer surface and the other end (e.g. drain) on top. In another arrangement a NAND string is formed in a U-shape so that both ends of the NAND string are accessible on top, thus facilitating connections between such strings. Examples of such NAND strings and their formation are described in U.S. Patent Publication Number 2012/0220088 and in U.S. Patent Publication Number 2013/0107628, which are hereby incorporated by reference in their entirety.

FIG. 7 shows a first example of a NAND string 701 that extends in a vertical direction, i.e. extending in the z-direction, perpendicular to the x-y plane of the substrate. Memory cells are formed where a vertical bit line (local bit line) 703 passes through a word line (e.g. WL0, WL1, etc.). A charge trapping layer between the local bit line and the word line stores charge, which affects the threshold voltage of the transistor formed by the word line (gate) coupled to the vertical bit line (channel) that it encircles. Such memory cells may be formed by forming stacks of word lines and then etching memory holes where memory cells are to be formed. Memory holes are then lined with a charge trapping layer and filled with a suitable local bit line/channel material (with suitable dielectric layers for isolation).

As with planar NAND strings, select gates 705, 707, are located at either end of the string to allow the NAND string to be selectively connected to, or isolated from, external elements 709, 711. Such external elements are generally conductive lines such as common source lines or bit lines that serve large numbers of NAND strings. Vertical NAND strings may be operated in a similar manner to planar NAND strings and both SLC and MLC operation is possible. While FIG. 7 shows an example of a NAND string that has 32 cells (0-31) connected in series, the number of cells in a NAND string may be any suitable number. Not all cells are shown for clarity. It will be understood that additional cells are formed where word lines 3-29 (not shown) intersect the local vertical bit line.

FIG. 8 shows a second example of a NAND string 815 that extends in a vertical direction (z-direction). In this case, NAND string 815 forms a U-shape, connecting with external elements (source line "SL" and bit line "BL") located on the top of the structure. At the bottom of NAND string 815 is a controllable gate (back gate "BG") which connects the two wings 816A, 816B of NAND string 815. A total of 64 cells are formed where word lines WL0-WL63 intersect the vertical local bit line 817 (though in other examples other numbers of cells may be provided). Select gates SGS, SGD, are located at either end of NAND string 815 to control connection/isolation of NAND string 815.

Figure 9:
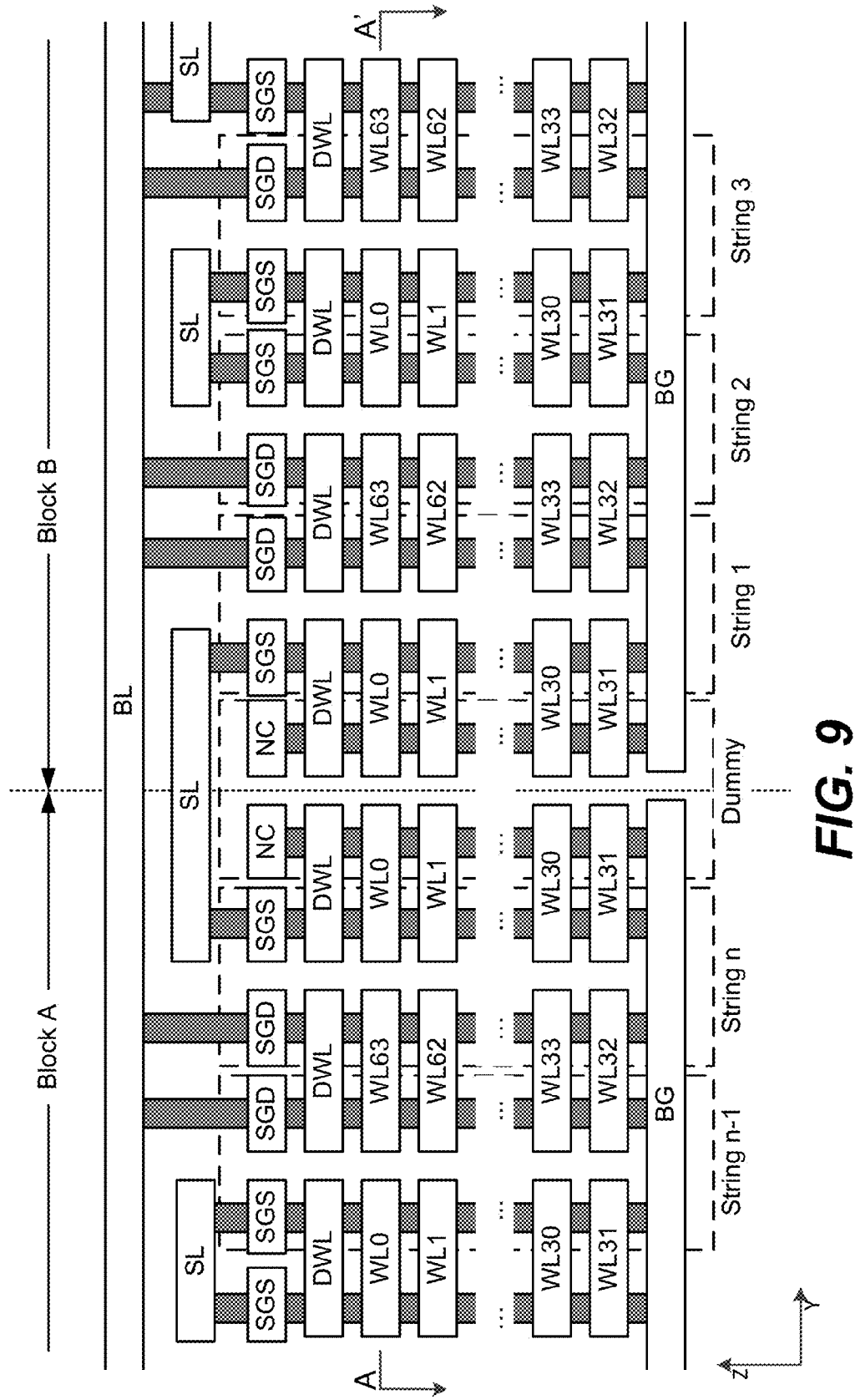
FIG. 9 shows a cross section of a 3-D NAND memory array in the y-z plane.

Vertical NAND strings may be arranged to form a 3-D NAND array in various ways. FIG. 9 shows an example where multiple U-shaped NAND strings in a block are connected to a bit line. In this case, there are n strings (Sting 1-String n) in a block connected to a bit line ("BL"). The value of "n" may be any suitable number, for example, 8, 12, 16, 32, or more. Strings alternate in orientation with odd numbered strings having their source connection on the left, and even numbered strings having their source on the right. This arrangement is convenient but is not essential and other patterns are also possible.

Figure 10:
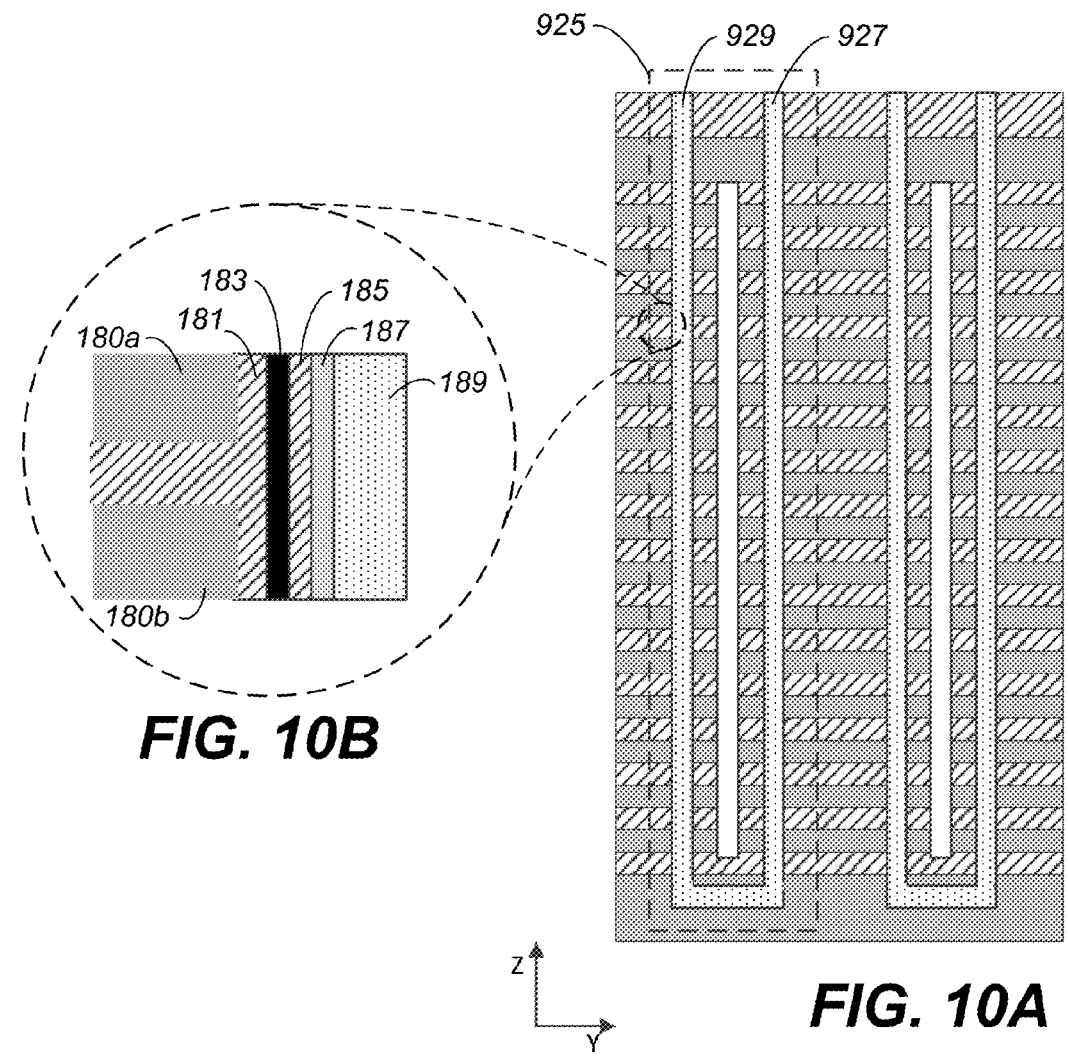
FIGS. 10A-10B show an example of structures of 3-D NAND strings.

FIG. 10A shows a cross section along a y-z plane that intersects memory holes 927, and 929 of NAND string 925 so that the structures formed within memory holes (memory hole structures) may be clearly seen. FIG. 10A shows that memory holes 927 and 929 are connected together at the bottom so that the two wings may be electrically connected in series by a controlled back gate or by a permanent connection.

FIG. 10B shows the structure of a stack of layers in the memory hole 929 where memory cells are formed. It can be seen that a blocking dielectric "Block" 181 is deposited on the walls of the memory hole to provide electrical isolation from word lines 180a, 180b. A Charge Trapping Layer (CTL) 183 is deposited on the blocking dielectric 181. The CTL layer 183 forms charge storage elements where the CTL is in close proximity to polysilicon word lines 180a, 180b. A tunnel dielectric 185 is deposited to provide electrical isolation and to allow charge to tunnel into the CTL layer 183 under certain conditions. A channel layer 187 is deposited to form the channel of the memory cells along the string. A core material 189 is deposited that forms the core of the column that is located in the memory hole.

Relaxation Time

In some nonvolatile memories, memory cells may be unstable for some period of time after they are programmed. Whatever physical property of a memory cell is changed during programming may not settle into a stable state until sometime after programming is complete. Memory cells may undergo some change in physical properties during a relaxation time that follows programming. By the end of the relaxation time cells reach a reasonably stable condition and may be expected to remain in the stable condition for an extended period of time.

In the example of flash memory, threshold voltage is the physical property that is changed during programming, and cells that are programmed to a particular threshold voltage during programming may see some drop in threshold voltage during a relaxation period that follows programming. While aspects of the present invention are illustrated with respect to charge storage memory, it will be understood that this is simply an example of a type of nonvolatile memory that may have some relaxation time after programming, and that the benefits described here are not limited to any particular type of memory. Other forms of memory that use other physical properties may also have some relaxation time and may benefit from some of the techniques described here. For example, memories that use ferroelectric properties (FeRAM), phase change, electrical resistance (ReRAM), or other properties may see some change in the programmed property immediately after programming.

Figure 11:
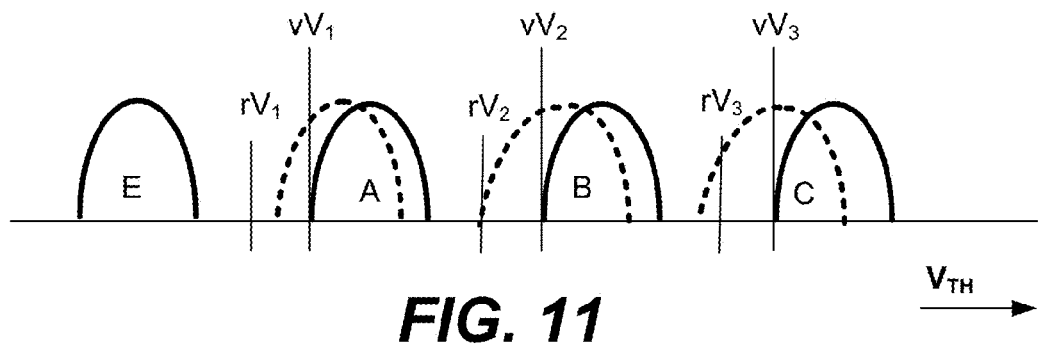
FIG. 11 illustrates relaxation in nonvolatile memory.

FIG. 11 illustrates how relaxation may affect threshold voltages of programmed charge-storage memory cells during a relaxation time that follows programming. Memory cells in FIG. 11 are programmed and verified as previously described (e.g. as shown in FIG. 6C). Thus, a population of cells is programmed to state A and these cells are verified using verification voltage $vV_1$, another population of cells is programmed to state B and verified using $vV_2$, and another population of cells is programmed to state C and verified using $vV_3$. In this case, after memory cells are programmed and verified, threshold voltages of at least some of the cells shift downwards so that overall distributions for each programmed state shift downwards as illustrated by distributions shown by dashed lines in FIG. 11. These shifts occur during a relaxation time. The distributions shown by dashed lines then remain for an extended period of time (i.e. memory cells remain stable once they reach the distributions shown).

When memory cells are later read, threshold voltage shifts that occur during relaxation may cause data to be misread. For example, the threshold voltage distribution for state C is shown being shifted so that a significant number of cells are below the read voltage for the C state, $rV_3$. Such cells may be read as being in the B state. If there are a large number of such cells then the data may be uncorrectable by ECC (i.e. the number of bad bits may exceed the capacity of any ECC scheme used in the memory). While distributions for states A and B show smaller shifts that would not cause misreading immediately after relaxation, these distributions may be vulnerable to any subsequent change (e.g. due to disturbance or leakage).

Shifts in threshold voltage distributions may be different for different states as shown in FIG. 11. Some data patterns may be more affected by such relaxation as a result (e.g. data that causes more cells to be programmed to the C state in FIG. 11 may be more vulnerable than data that causes fewer cells to be programmed to the C state).

Relaxation characteristics, such as relaxation time and the magnitude of any shift caused by relaxation, may be different from one type of memory to another. For example, charge-storage memories that use conductive floating gates may have different relaxation characteristics to charge-storage memories that use charge trapping layers. Three dimensional memories may have different relaxation characteristics to two dimensional (planar) memories.

Within a given memory, relaxation effects may not be the same at all locations. For example, processing differences from one location to another may produce variation in memory cell dimensions, or material properties, which may result in different relaxation characteristics at different locations on a substrate. Thus, some dies on a wafer may have significant relaxation effects while other dies may not. Within a die, some blocks may be more affected by relaxation than others. Within a block, some word lines may be more affected than others. For example, in some three dimensional memory structures, memory cell dimensions such as memory hole diameter may vary according to vertical location. Such variation may result in different relaxation characteristics from word line to word line within a block. Relaxation time may be determined for all memory cells that are formed according to a particular design (i.e. for all blocks of all memory ICs of a particular design) or may be determined individually for different ICs (e.g. during testing), or may be individually determined for different blocks, or word lines within blocks.

Furthermore, the effects of relaxation may depend on how particular memory cells are operated. For example, flash memories that divide cell threshold voltage ranges into larger numbers of states, to store more data per cell, may be more affected by shifting threshold voltages because of the relatively narrow threshold voltage ranges associated with logic states (and the relatively small distances between such ranges). Thus, in a given memory, blocks that are operated as MLC blocks may be affected by relaxation while identical blocks that are operated as SLC blocks may be relatively unaffected by the same relaxation phenomenon because SLC is more tolerant of threshold voltage shifts.

It has been found that some three dimensional NAND memory structures that use a charge trapping layer, when operated in MLC mode (i.e. more than two states per cell), experience relaxation that may be significant (e.g. producing significant numbers of bad bits). For example, relaxation may produce a voltage shift of up to 0.5 volts during a relaxation time of as much as 1 second in some cases. Other memories, including other charge storage memories may also experience significant relaxation effects.

It will be understood that relaxation is generally significant only if there is some significant change over a significant time period. If the change in physical property is small, it may be ignored. If the change in physical property occurs rapidly, then it may largely occur between a program step and a subsequent verification step and may be ignored (may not be detected, or detectable). A relaxation time may be considered to be significant if it is long enough to allow a post-write read operation to sense memory cells prior to the read cells coming to rest in a stable state due to the relaxation effect.

In many cases, such relaxation may affect any reading of memory cells during the period of time immediately after programming. This may have a significant impact, particularly in memories in which a read operation is likely to occur during this post-write period.

Post-Write Read

In some memories, data may be read soon after it is programmed to confirm that it is correctly programmed. Such a post-write read provides confirmation that data is acceptable. If a post-write read indicates that the data is not acceptable then the data may be recovered from elsewhere. For example, another copy or some redundancy data allowing recovery of the data may be maintained in the memory until post-write read confirms that the newly-written copy is acceptable. After the newly-written copy is confirmed as acceptable, any redundant copy or redundancy data may be deleted. Thus, the data may no longer be recoverable from elsewhere after confirmation by post-write reading. This makes accuracy of post-write reading particularly important since a false confirmation that the data is acceptable could leave the newly-written copy in an unacceptable condition with no means of recovery. Examples of post-write reading systems and methods are described in U.S. Patent Application Publication Numbers 2013/0028021, 2013/0031430, and 2013/0031431, which are hereby incorporated by reference in their entirety.

According to an aspect of the present invention, a memory system takes relaxation time into account when performing post-write read to ensure that data subject to post-write read has reached a stable state. A post-write read may be initiated for a particular portion of data only after a determination that the time since writing of the portion of data exceeds a threshold time (e.g. relaxation time, or some threshold greater than the relaxation time). For example, a post-write read of the data in FIG. 11 would only be performed after the data reaches the shifted distributions (dashed lines) and not during the shift from initial distributions to shifted distributions (i.e. not during relaxation time). While premature post-write reading during such a shift could falsely indicate acceptable data, post-write reading after such a shift will accurately reflect conditions of cells as they are likely to be read subsequently. Thus, false indications of acceptable data (and resulting loss of data) are avoided.

Figure 12:
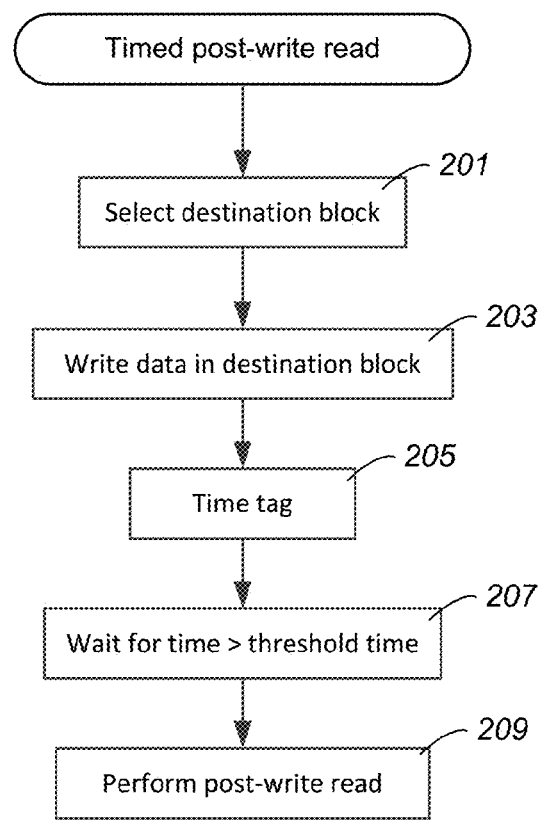
FIG. 12 illustrates a method of timed post-write read.

FIG. 12 shows an example of a timed post-write scheme. A destination block is selected 201 for writing data. The data may be written, for example, as part of writing new data in response to a host write command, or may be part of a copy operation. The destination block in this example may be any block that is likely to experience some significant relaxation after writing. In some cases, all writes in a given memory may be considered to be at risk from relaxation effects. In other cases, only particular writes may be considered to be at risk, e.g. only MLC writes, or only writes to certain blocks, or certain word lines. The data is written in the destination block 203, for example, by a series of programming pulses and verification steps. A time tag is used in this example to indicate the time at which programming ends 205, or a time after programming ends. Subsequently, the system waits for a time that is greater than the relaxation time 207. The memory system may be busy with other operations during this waiting period. A timing unit may make a determination as to when the wait time exceeds a threshold time, which may be the relaxation time or some time greater than the relaxation time (to provide some margin for error). After it is determined that the time from the time tag exceeds the threshold time, a post-write read of the data may be performed 209 to determine if the data is acceptable. The criteria for data to be considered acceptable may depend on a number of factors including the capacity of any ECC scheme, or other scheme, to correct errors. At this time, the risk of any further change in memory cell states due to relaxation is negligible and data read by post-write read may be considered stable.

Timed post-write reading may be applied in many different ways depending on the type of memory and the relaxation characteristics (extent of change in any property and the time over which such a change occurs).

Block-Level

Figure 13:
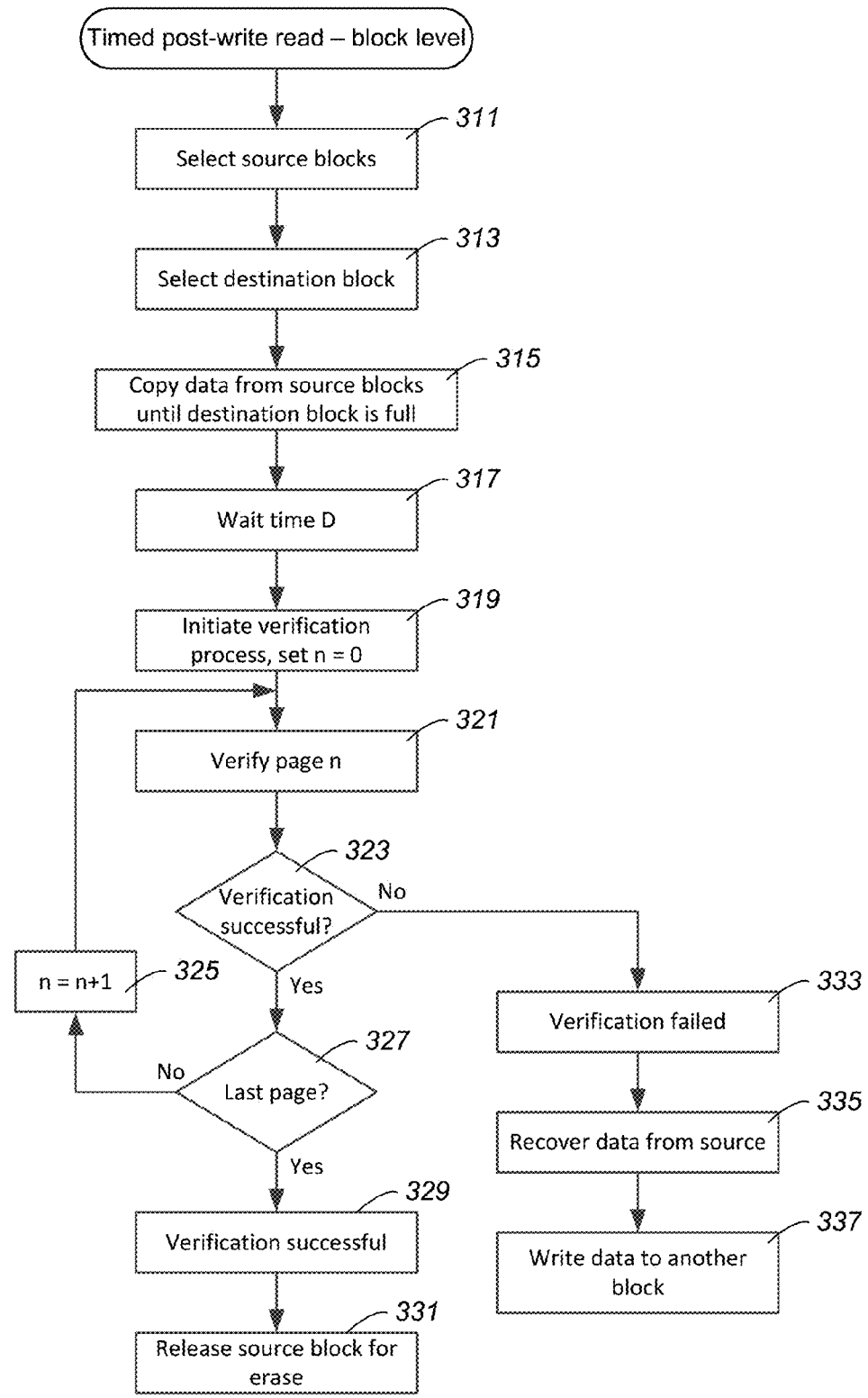
FIG. 13 illustrates an example of post-write read with block level timing.

One way to implement a timed post-write read scheme is on a block-by-block basis. In this case, post-write read of a block is initiated only after the time from the end of programming of the block exceeds a threshold time (which is equal to or greater than the relaxation time). FIG. 13 shows an example of a scheme which is implemented on a block level. In this example, data is being copied from a source block to a destination block (e.g. from an SLC binary cache block to an MLC long-term storage block). Source blocks (e.g. two SLC blocks) are selected for copying 311. A destination block where the data is to be written is selected 313. The data is copied from the source blocks to the destination block until the destination block is full 315. A time tag, or other timing indicator, allows time to be tracked after the last write to the destination block. The post-write read scheme waits for a time D 317 before initiating a post-write verification process 319 to ensure that memory cells are in a stable condition. A page number, n, is initialized to zero at this point. Then, page n is verified (i.e. a determination is made as to whether page n is acceptable or not) 321. If the page is acceptable, then verification is successful 323, and the scheme goes to the next page 325 and performs the same verification until the last page is reached 327. Then, verification is considered successful for the block 329, and the source blocks are released for erase 331 as they are no longer needed. If verification is unsuccessful for any page then verification fails 333, the data is recovered from elsewhere 335, and is written to another block 337 (e.g. another MLC destination block is selected and the present block may be marked for erase).

Verification may be performed in any suitable manner. In some cases where data is copied from a source to a destination, the two copies may be compared to verify that the destination copy is an accurate copy. Thus, after data is written to the destination block it is read out and may be compared with the original version (from the source block). For example, the two copies may be subject to an exclusive OR (XOR) operation to determine the number of bits that are different between copies. The copy from the source block may be assumed to be a good copy so that any differences may be assumed to be the result of bad bits in the destination block. If the number of such bad bits exceeds a threshold number then the copy in the destination block may be considered unacceptable.

In some cases, verification that a page is acceptable may use ECC rather than a comparison with another copy. For example, data may be read out of the destination block and sent to an ECC decoder where it is decoded and the number of errors determined. The number of errors is then compared to a threshold number to determine whether the data is acceptable or not.

In some cases, a Bit Error Rate (BER) estimation process may be used to obtain an indication of the number of errors in the data without performing full ECC decoding of the data (which may be time consuming). In an example, a portion of data that is encoded by an ECC scheme prior to storage is subsequently analyzed to determine how many parity equations are satisfied without searching for a solution to the equations (i.e. without performing error correction). While the number of unsatisfied equations is not the same as the number of bad bits (one bad bit may affect multiple equations), unsatisfied equations give a rough indication of the quality of the data (more unsatisfied equations indicates more bad bits). If the number of unsatisfied equations is lower than a threshold number then the data may be considered acceptable. If the number of unsatisfied equations is higher than a threshold number then the data may be considered unacceptable, or may be subject to further analysis. For example, the data may be further analyzed by being decoded by ECC (i.e. by finding solutions to parity equations) to determine how many bad bits are present in this case. Such a scheme allows a rapid determination that data is acceptable by only applying ECC decoding to data that has failed an initial screening.

Page-Level

Figure 14:
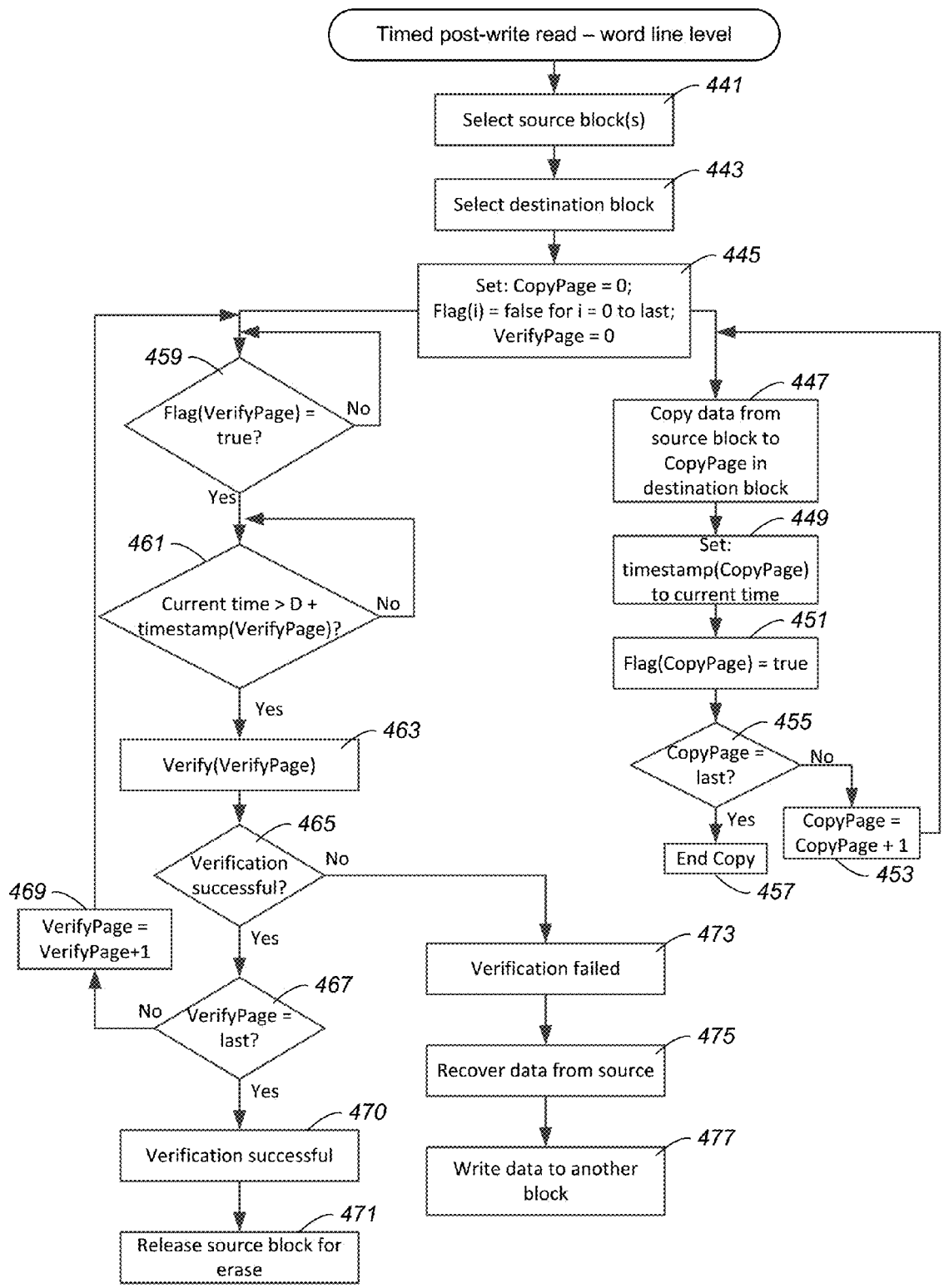
FIG. 14 illustrates an example of post-write read with page level timing.

An alternative to the block level timing of FIG. 13 is page level timing in which time is monitored separately for individual pages rather than for a block. FIG. 14 illustrates an example of a word line level scheme. As before, a source block or blocks is/are selected 441 and a destination block is selected 443. Various parameters are initialized 445. Copy-Page is initialized to zero to start copying with the first page of the block, page 0. Flag(i) is set to be "false" for i=0 to last so that all pages are indicated to be not copied. VerifyPage is initialized to zero to start verifying with the first page of the block, page 0.

A copy subroutine copies data from a source block or blocks to CopyPage (initialized to page 0) in the destination block 447. This may include copying data from more than one page in one or more SLC blocks to a page in an MLC block. When the data is written in the destination block a timestamp for the current page (CopyPage) is set either immediately, or some short time after completion of the writing 449. The timestamp may be recorded so that it can be used later. The flag for the current page is then set to "true" to indicate that the page has been copied 451. The copy subroutine then moves to the next page in the destination block (CopyPage is incremented by one) 453. If the current page is the last page 455 in the block then the copy subroutine ends for the current block 457.

A post-write read subroutine waits until a current page is indicated to be copied by the flag previously described 459. Then, the current time is compared with the timestamp recorded for the page to determine if the current time is later than the timestamp by at least a threshold time period, D 461. If the current time is not later by at least D, then the subroutine waits until it is, and then proceeds to perform verification of the page 463 (e.g. by comparison of copies, ECC, BER estimation, or otherwise). A determination is made as to whether verification of the current page is successful 465. If it is successful, and the current page is not the last page of the block 467, then the subroutine moves on to the next page in the destination block (VerifyPage is incremented by one) 469. If the current page is the last page 467 then verification is considered successful 470 and the source block or blocks is/are released for erase 471. If verification of the current page is not successful 465, verification may be considered to have failed 473, the data may be recovered from elsewhere 475, and the data may be written to another block 477.

The two subroutines shown in FIG. 14 may be considered to operate in parallel on the same block. While certain steps of the subroutines cannot be performed simultaneously because they require accessing the block (i.e. the verify subroutine cannot read data from the destination block while the copy subroutine is writing data to the destination block), other steps may be performed at the same time (e.g. a page that has been read out may be verified while another page is being copied on-chip). Some steps may be interleaved so that subroutines alternately access the block (e.g. reads for verification may be interleaved with writes to the destination block).

Data Recovery

In some cases, when a post-write read indicates that data in a destination block is unacceptable, the data may be recovered from a source block or blocks. The copy in the source block, or blocks, may be considered a safe copy. However, in some cases such a safe copy is not available. In some cases a host or memory controller may maintain a safe copy until data is confirmed by post-write read. However, this may require significant storage and may not be available.

In some memory systems, a redundancy scheme allows recovery of a good copy of a portion of data from redundancy data generated using the portion of data and other portions of data. For example, host data stored in different pages of a memory array may be used to generate one or more pages of redundancy data prior to storage. If any of the pages of host data are found to be unacceptable when they are subject to a post-write read then a good copy of the page may be regenerated from the other pages and the redundancy data. In one example, data of different pages is XORed together prior to storage to generate a parity page. Data of any page can then be regenerated from the parity page and the other pages used to generate it (provided the other pages remain good). Examples of systems and methods for recovering portions of data using such redundancy schemes are described in U.S. Patent Application Publication Number 2013/0031429, entitled, "Data recovery for defective word lines during programming of non-volatile memory arrays," which is hereby incorporated by reference in its entirety.

In other cases, the number of errors in unacceptable data may be small enough to be corrected by ECC (i.e. data may be bad enough to fail post-write read but not so bad that it is uncorrectable by ECC. Such data may be recovered using ECC even if there is no other copy of the data stored in the memory system.

Figure 15:
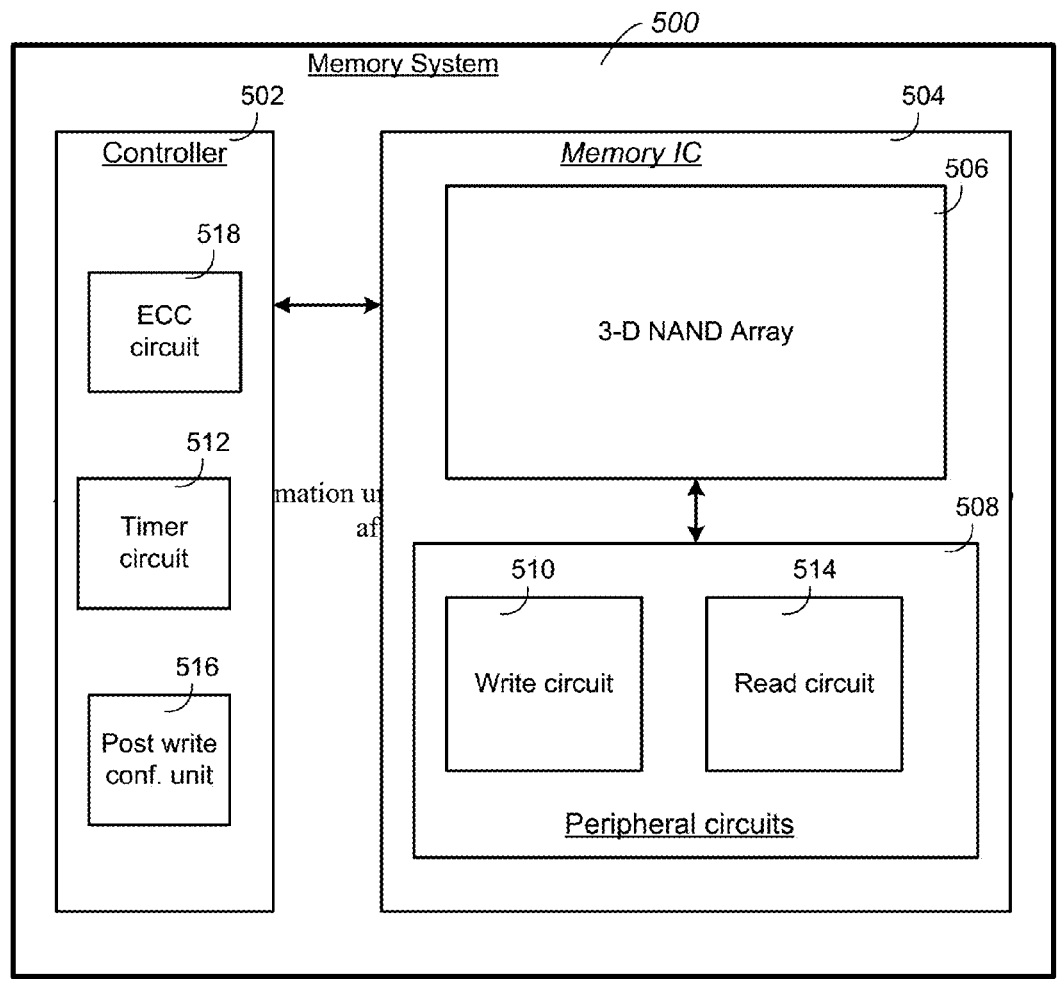
FIG. 15 shows an example of memory system hardware.

FIG. 15 shows an example of a memory system 500, which includes components that may be used to implement techniques described above. Memory system 500 includes a memory controller 502 and a memory IC 504. The memory IC includes a memory array 506 (e.g. a three dimensional memory array that uses a charge trapping layer to form charge-storage elements of MLC cells). Peripheral circuits 508 include write circuit 510, which writes data in memory array 506. A read circuit 514 reads data from pages of memory array 506. Memory controller 502 includes ECC unit 518. Timer unit 512 may maintain time tags for pages of data after they are programmed by write circuit 510. This allows determination of elapsed time from a given time tag. A post-write confirmation unit 516 confirms that data read from memory array 506 after it is written is acceptable. In other examples, these circuits may be arranged differently, e.g. an ECC unit may be formed in peripheral circuits, a post-write confirmation unit may be at least partially located in peripheral circuits, etc.).

CONCLUSION

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

It is claimed:

1. A method of operating a memory array comprising:
   performing a write operation that writes data to a destination block;
   subsequently maintaining a time tag that indicates a time equal to or later than a time of completion of the write operation;
   comparing elapsed time from the time tag with a predetermined minimum elapsed time; and
   performing a post-write read operation to verify that data in the destination block is acceptable only after the elapsed time meets or exceeds the predetermined minimum elapsed time.

2. The method of claims 1 wherein the write operation is part of a copy operation.

3. The method of claim 2 wherein the copy operation copies data from a source block to the destination block and the data in the destination block is verified as acceptable by comparison with corresponding data in the source block.

4. The method of claim 3 wherein the source block is a Single Level Cell (SLC) block and the destination block is a Multi Level Cell (MLC) block.

5. The method of claim 1 wherein the data in the destination block is verified as acceptable by applying Error Correction Code (ECC) decoding to determine a number of errors in the data.

6. The method of claim 1 wherein the data in the destination block is verified as acceptable by estimating a number of bad bits in the data in the destination block from numbers of satisfied and/or unsatisfied parity equations.

7. The method of claim 1 wherein the write operation is part of a sequence of write operations to the destination block and wherein the time tag indicates a time equal to or later than a time of completion of the sequence of write operations.

8. The method of claim 1 wherein the write operation is directed to a page of the destination block, the method further comprising writing additional data to additional pages of the destination block and maintaining an additional time tag for each additional page written to the destination block.

9. The method of claim 8 wherein the post-write read operation of the page is performed before completion of the writing to at least one of the additional pages of the destination block.

10. The method of claim 8 wherein the post-write read operation of the page is performed only after all writing to the additional pages of the destination block is complete.

11. The method of claim 1 wherein the predetermined minimum elapsed time exceeds a relaxation time of the memory.

12. A nonvolatile memory system comprising:
a nonvolatile memory array that includes a plurality of blocks;
a write circuit that writes data to a destination block;
a timer unit that maintains a time tag that indicates a time equal to or later than a time of writing of the data to the destination block; and
a post-write verification unit that initiates a post-write verification operation to determine whether data written to the destination block is acceptable only after the timer unit indicates the elapsed time from the time tag exceeds a predetermined period.

13. The nonvolatile memory system of claim 12 further comprising a read circuit that reads the data from a source block and sends the data to the write circuit.

14. The nonvolatile memory system of claim 13 wherein the post-write verification unit comprises a comparison unit for comparing a copy of the data read from the destination block with a copy of the data read from the source block.

15. The nonvolatile memory of claim 14 wherein the source block is a Single Level Cell (SLC) block and the destination block is a Multi Level Cell (MLC) block.

16. The nonvolatile memory system of claim 12 further comprising an Error Correction Code (ECC) circuit that determines a number of bad bits in a copy of the data read from the destination block in the post-write verification operation.

17. The nonvolatile memory system of claim 12 further comprising an error estimation circuit that estimates a number of bad bits from numbers of satisfied and/or unsatisfied parity equations.

18. The nonvolatile memory system of claim 12 wherein the timer unit maintains a single time tag for a sequence of write operations to the destination block, the time tag indicating a time equal to or later than a time of completion of the sequence of write operations.

19. The nonvolatile memory system of claim 12 wherein the timer unit maintains time tags for individual pages written in a sequence of write operations to the destination block, an individual time tag indicating a time equal to or later than a time of writing data to a corresponding page in a corresponding write operation of the sequence of write operations.

20. The nonvolatile memory system of claim 19 wherein the post-write verification unit initiates the post-write verification operation to determine whether data written to a first page in a first write operation of the sequence of write operations is acceptable prior to the write circuit writing additional data to a second page in second write operation of the sequence of write operations.

21. The nonvolatile memory system of claim 19 wherein the post-write verification unit initiates the post-write verification operation to determine whether data written in the sequence of write operations to the destination block is acceptable only after all writing in the sequence of write operations to the destination block is complete.

22. The nonvolatile memory system of claim 12 wherein the nonvolatile memory array has a relaxation time and the predetermined period exceeds the relaxation time.

* * * * *